March 18, 1941.   H. E. TRACEY   2,234,992
SELF-FEEDING FLOWER OR PLANT POT
Filed March 22, 1939
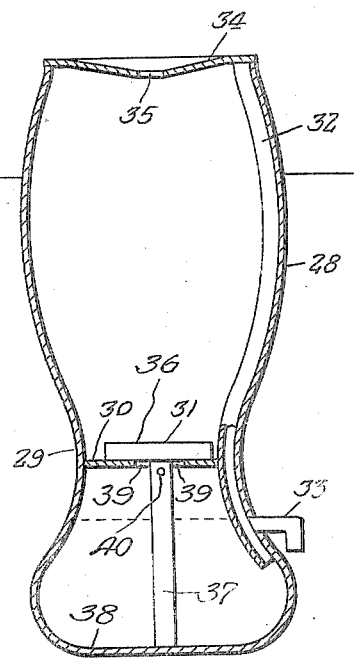
Inventor
Harvey E. Tracey.
By Clarence A. O'Brien
and Hyman Berman
Attorneys Patented Mar. 18, 1941

2,234,992

UNITED STATES PATENT OFFICE 2,234,992

SELF-FEEDING FLOWER OR PLANT POT

Harvey E. Tracey, Fredericksburg, Ohio, assignor of one-fourth to J. Lloyd Parker, Fredericksburg, Ohio Application March 22, 1939, Serial No. 263,522

2 Claims. (Cl. 47—38)

This invention relates to pots or receptacles for the growing of flowers, plants and the like, and has for the primary object the provision of a device of this character which will feed water, air and food directly to the soil in which the plant is grown so that the soil will be kept in proper condition for promoting the growth of the plant and will deliver the moisture, air and food into the soil close to the roots of the plant to assure maximum growth thereof and also will prevent hardening or caking of the soil as well as tending to prevent the soil from souring.

With these and other objects in view, the invention consists in certain novel features of construction, combination and arrangement of parts to be hereinafter more fully described and claimed.

For a complete understanding of my invention, reference is to be had to the following description and accompanying drawing, in which the single figure is a view in vertical section illustrating the invention.

Referring to the drawing by numerals, according to my invention, a receptacle 28 is provided which has a restricted portion 29 at a selected distance below its upper end and in which is located a centrally apertured, soil-supporting wall 30 carrying a feeder 31. The space between the bottom wall 38 of the receptacle and the wall 30 defines a combined air and water chamber or reservoir. A tube 32 extends from the upper end of the receptacle to a point adjacent the bottom wall 38 for feeding water into said reservoir. The lower portion of the receptacle, below the restricted portion, has an overflow pipe 33 inserted therein and connecting with the tube 32 for regulating the height of the water in the reservoir so that air will be trapped between the wall 30 and the surface of the water.

A cover 34 may be employed on the upper end of the receptacle 28 and which slopes towards the center and is provided in its center with an opening 35 through which the growing plant may extend. The surface of the cover is to direct water into the soil when the device is used outdoors and further functions to retard the entrance of insects into the receptacle or into the soil within the latter.

The feeder 31 is of mushroom form and includes a disc 36 which rests on the wall 30, and a depending portion, or stem, 37 that rests on the bottom wall 38 of the receptacle. The wall 30 may be provided with notches 39 to permit projections, one of which is shown at 40 on the stem 37, to pass through the same and then come to lie under the wall 30 to prevent displacement of the feeder 31 when the pot or receptacle 28 is empty of soil.

It is to be understood, that the space in the receptacle 28 above the wall 30 is for the purpose of containing soil in which the plant may be grown.

The feeder 31 is constructed of fertilizer of a porous nature so that the water in the reservoir will be absorbed and transmitted to the soil by capillary attraction. The water passing through the pores of the feeder and the latter being of porous fertilizer material will impregnate the water with food to promote the growth of the plant in the soil in the receptacle. The feeder 31 being of porous material also will take in air from the space above the water and deliver the air into the soil adjacent the roots of the plant. The feeder 31 may consist of the following ingredients:

One pound of plaster of Paris
One gram of potassium nitrate
One gram of potassium phosphate
One gram of magnesium sulphate, and
One gram of calcium nitrate.

These ingredients are mixed with sufficient water to bring the ingredients into paste form and they are then placed in a suitable mold to set and form into the shape described in connection with the feeder. While the feeder 31 has been described as consisting of the foregoing ingredients, other ingredients that are nourishable for the growth of a plant or flower may be employed.

In operation, the plant or flower is placed in the soil to a desired depth and the water is then fed into the reservoir by way of the tube 32 trapping air in the reservoir between the wall 30 and the upper surface of the water. The feeder 31 will then absorb the water and air with the water, becoming impregnated with the ingredients which go to make up the feeder so that the moisture let off by the feeder into the soil will contain nourishment, air and moisture in proper proportions to promote the growth of the flower or plant. Of course, whenever it is necessary to replenish the supply of air trapped in the reservoir, the latter is emptied of water and then again filled by way of the tube 32 which again brings about trapping of air between the surface of the water and the wall 30. Thus it will be seen that a self-feeding pot, or receptacle, is provided for the growth of plants, flowers and the like and may be utilized indoors or outdoors. It is preferable that the upstanding walls of the receptacle 29, or pot, be constructed of transparent material such as glass which will allow the light rays to contact the soil.

When the device is used outdoors, and it rains, the soil becomes saturated with water and the feeder 31 being porous will absorb this water thereby reducing the moisture content of the soil to an extent that the soil will not become sour or furnish an over-supply of moisture to the growing plant.

It is believed that the foregoing description, when taken in connection with the drawing, will fully set forth the construction and advantages of this invention to those skilled in the art to which such a device relates, so that further detailed description will not be required.

Having thus described my invention, what I claim is:

1. In a device of the character described, a receptacle including upstanding walls and a bottom wall, with the upstanding walls provided with a restricted portion spaced from the bottom wall, a soil supporting wall arranged in the restricted portion of the receptacle and forming a combined air and water reservoir between the bottom wall and said soil supporting wall, an absorbent feeder containing food ingredients for plants supported by said soil supporting wall and partly overlying the latter and extending downwardly in the reservoir and resting on the bottom wall, a tube carried by the receptacle and extending from the upper end thereof to a point adjacent the bottom wall, an overflow pipe connected with the receptacle and tube above the lower end of said tube.

2. In a device of the character described, a receptacle including upstanding walls and a bottom wall, with the upstanding walls provided with a restricted portion spaced from the bottom wall, a soil supporting wall arranged in the restricted portion of the receptacle and forming a combined air and water reservoir between the bottom wall and said soil supporting wall, an absorbent feeder containing food ingredients for plants supported by said soil supporting wall and partly overlying the latter and extending downwardly in the reservoir and resting on the bottom wall, a tube carried by the receptacle and extending from the upper end thereof to a point adjacent the bottom wall, an overflow pipe connected with the receptacle and tube above the lower end of said tube, and a cover for the upper end of the receptacle and sloping toward the center thereof and provided with an opening in the center.

HARVEY E. TRACEY.